United States Patent
Nakagawa et al.

(10) Patent No.: US 7,916,392 B2
(45) Date of Patent: Mar. 29, 2011

(54) POLARIZATION CONTROL SYSTEM AND PROJECTOR INCORPORATING REFLECTIVE LIQUID CRYSTAL ELEMENT AND BIREFRINGENT ELEMENTS

(75) Inventors: Kenichi Nakagawa, Minato-ku (JP); Hiroki Takahashi, Minato-ku (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 316 days.

(21) Appl. No.: 12/204,239

(22) Filed: Sep. 4, 2008

(65) Prior Publication Data
US 2009/0067049 A1 Mar. 12, 2009

(30) Foreign Application Priority Data
Sep. 6, 2007 (JP) .................. 2007-231997

(51) Int. Cl.
*G02B 27/28* (2006.01)
(52) U.S. Cl. .............. 359/497; 359/494; 353/20; 349/5; 349/119; 349/121
(58) Field of Classification Search .................. None
See application file for complete search history.

(56) References Cited

U.S. PATENT DOCUMENTS

| | | | |
|---|---|---|---|
| 5,504,603 A * | 4/1996 | Winker et al. | 349/117 |
| 6,157,471 A * | 12/2000 | Bignolles et al. | 359/15 |
| 6,340,230 B1 | 1/2002 | Bryars et al. | |
| 6,493,053 B1 * | 12/2002 | Miyachi et al. | 349/117 |
| 6,587,171 B1 * | 7/2003 | Georges et al. | 349/120 |
| 6,642,980 B1 * | 11/2003 | Bignolles et al. | 349/117 |

FOREIGN PATENT DOCUMENTS

| | | |
|---|---|---|
| JP | 02-250026 A | 10/1990 |
| JP | 06-289222 A | 10/1994 |
| JP | 10-206842 A | 8/1998 |
| JP | 2000-112020 A | 4/2000 |
| JP | 2003-255330 A | 9/2003 |

OTHER PUBLICATIONS

Robinson et al., "Wide Field of View Compensation Scheme for Cube Polarizing Beam Splitters", SID '03 Digest pp. 874, Society for Information Display.

* cited by examiner

*Primary Examiner* — Arnel C Lavarias
(74) *Attorney, Agent, or Firm* — Buchanan Ingersoll & Rooney PC

(57) ABSTRACT

A phase compensation element is disposed between a reflective type display element and a polarizing beam splitter. Composed of a crystal structure retardation layer functioning as a quarter-wave plate and an inclined-axis retardation layer functioning as an O-plate, the phase compensation element is aligned substantially parallel to a reflective surface of the reflective type display element. The inclined-axis retardation layer is made of inorganic material obliquely deposited on the crystal structure retardation layer. The inclined-axis retardation layer has a principal refractive index axis inclined at between 0° and 45° to a surface normal of the crystal structure retardation layer, and has a thickness not to increase haze of the phase compensation element.

6 Claims, 7 Drawing Sheets

POLARIZATION CONTROL SYSTEM AND PROJECTOR INCORPORATING REFLECTIVE LIQUID CRYSTAL ELEMENT AND BIREFRINGENT ELEMENTS

FIELD OF THE INVENTION

The present invention relates to a polarization control system for image display apparatus which reproduce and display information depending on a polarization state of light, and a projector having this polarization control system.

BACKGROUND OF THE INVENTION

Recently, a type of image display apparatus which enlarges and projects an image displayed on LCD, LCOS (Liquid Crystal On Silicon) or DMD (Digital Mirror Device) onto a screen has been popular. The image display apparatus having the DMD can produce high brightness and high resolution images, but is too expensive for projection televisions and such commercial products. The image display apparatus having the LCD only produces low resolution images, and hardly provides high brightness due to its low aperture ratio. The image display apparatus having the LCOS, by contrast, is advantageously cheaper than the apparatus with the DMD, and can produce higher brightness and higher resolution images than the apparatus with the LCD.

In the image display apparatus having the LCOS, the light generated from a light source unit is separated into colors by a dichroic mirror. Each color light is adjusted to a predetermined polarization direction by a polarizer, and guided to the LCOS displaying an image corresponding to red, green or blue color. When reflected by the LCOS, each color light is converted into information light that carries the information of the image. The information light is transmitted through an analyzer, such as a polarizing beam splitter, and projected on a screen.

It is ideal if the light from the light source unit enters the LCOS at right angle. However, the light is actually a bundle of plural light rays, and contains skew rays that are inclined with respect to the display surface of the LCOS. These skew rays are reflected by the LCOS, and enter the polarizing beam splitter at an angle inclined from a prescribed incident axis. In this case, the polarizing beam splitter may transmit some light rays supposed to be reflected. The skew rays transmitted through the polarizing beam splitter will reduce the contrast of a projection image on the screen. At the same time, this contrast reduction due to the skew rays can be solved by a quarter-wave plate that compensates for the polarizing direction of the skew ray (see, for example, Japanese Patent Laid-open Publication No. 02-250026).

The quarter-wave plate is only effective to the skew rays inclined at 5° or below from a surface normal of the plate. Unfortunately, the skew rays generated in a projector are generally inclined at between 10° and 15° from the surface normal, and their polarizing direction cannot be compensated by the quarter-wave plate properly to provide sufficient contrast.

This angle dependency problem of the quarter-wave plate can be solved when a phase retarder, or so-called an O-plate, having a principal refractive index (main axis) inclined to the surface is adjusted in thickness and used as the quarter-wave plate. The O-plate used as the quarter-wave plate may be fabricated by cutting a crystal of uniaxial birefringent body, such as quartz, in a direction oblique to the main axis, or by applying and polymerizing rod-like liquid crystal molecules on a surface of the polarizing beam splitter (see, for example, "Wide Field of View Compensation Scheme for Cube Polarizing Beam Splitters" by M. G. Robinson et al, SID '03 Digest pp. 874, Society for Information Display).

Additionally, a polarization separating performance of the polarizing beam splitter can be enhanced and the image contrast reduction due to the skew ray can be prevented by forming a retardation layer (a phase difference layer) of two thin films with different refractive indices on a polarization separating layer of the polarizing beam splitter (see, for example, Japanese Patent Laid-open Publication No. 06-289222).

The image contrast reduction due to the skew ray can also be prevented by a retardation layer which is formed, as the quarter-wave plate, by obliquely depositing an inorganic dielectric material on a light valve (see, for example, Japanese Patent Laid-open Publication No. 10-206842).

However, the O-plate cut obliquely from the crystal may be impractical because it is difficult to shape and requires extra cost.

The O-plate of the rod-like liquid crystal molecules or such organic material, on the other hand, changes the inclination angle of the main axis depending on the property of the material. It is therefore difficult to set the main axis at an optically desirable inclination angle.

Additionally, the O-plate of the obliquely deposited inorganic dielectric material has the following drawback. To function as the quarter-wave plate, the O-plate needs to have main axis inclined at between 10° and 15° to the plate surface. In other words, the main axis of the O-plate should be inclined at between 75° and 80° to the surface normal of the plate. However, the actual O-plate fabricated by the oblique deposition has the main axis inclined at between 0° and 45° to the surface normal of the plate, and it is almost impossible to fabricate the O-plate having the main axis inclined at between 75° and 80°.

Even when the O-plate is fabricated by the oblique deposition or polymerization of the liquid crystal molecules, the O-plate needs to have a thickness of 1 μm or above to function as the quarter-wave plate. Such great thickness increases the haze, and the polarization is rather lowered.

Moreover, aforesaid retardation layer on the polarization separating layer will complicate the manufacturing process of the polarizing beam splitter.

SUMMARY OF THE INVENTION

In view of the foregoing, an object of the present invention is to provide an inexpensive polarization control system and projector which can prevent skew rays from lowering contrast of information light carrying information such as an image.

In order to achieve the above and other objects, a polarization control system according to the present invention includes a polarizing beam splitter, a reflective type liquid crystal element, a first birefringent element and a second birefringent element, and is characterized in that the light vertically passing through the first and second birefringent elements causes a total phase difference of substantially $\lambda/4$ where $\lambda$ designates wavelength of light. The polarizing beam splitter has a polarization separating layer to transmit or reflect incident light depending on a polarizing direction. The reflective type liquid crystal element has a reflective surface to reflect the light from the polarizing beam splitter back to the polarizing beam splitter, and controls the polarizing direction of light by the reflective surface. The first birefringent element is disposed between the polarizing beam splitter and the reflective type liquid crystal element, arranged parallel to the reflective surface. The first birefringent element has a slow axis on a plane parallel to the reflective surface. The second birefringent element is disposed between the polarizing beam splitter and the reflective type liquid crystal element. This second birefringent element contains an index ellipsoid which is inclined to the reflective surface and has a symmetrical plane perpendicular to the reflective surface. A direction of a principal refractive index on the symmetrical plane is parallel, when orthogonally projected on the reflective surface, to the slow axis of the first birefringent element.

The second birefringent element preferably comprises an oblique deposition film of inorganic material. Alternatively, the second birefringent element is also preferably made of a liquid crystal polymer.

In a preferred embodiment of the present invention, the second birefringent element is formed integral with the first birefringent element. Alternatively, the second birefringent element may be formed in the polarizing beam splitter.

According to the present invention, the phase difference of the skew ray can be compensated across a wider area than when a single quarter-wave plate is used. Additionally, the phase difference of the skew ray is compensated more easily and inexpensively than when a single O-plate is used as the quarter-wave plate. Since the phase difference of the skew rays is compensated in a wider area, the projector having this polarization control system provides a projection image with excellent contrast. Additionally, this projector can be manufactured more easily and inexpensively than the projectors having the single O-plate functioning as the quarter-wave plate.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
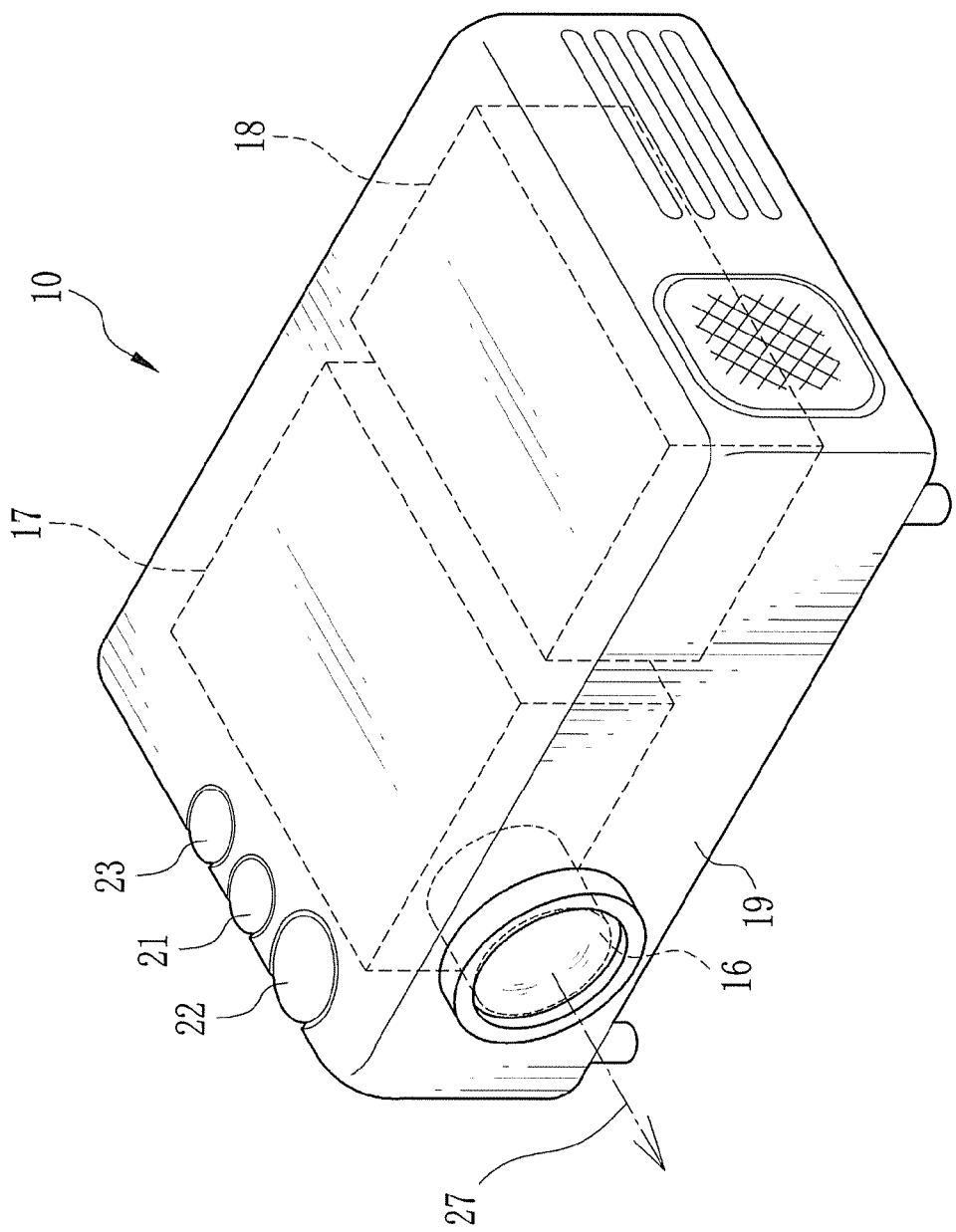
FIG. 1 is a perspective view of a projector according to a first embodiment of the present invention.

Referring to FIG. 1, a projector 10 includes a projection lens 16, a reflective display optical system (polarization control system) 17 and a projector drive section 18. On an upper surface of a case 19, there are provided with a zooming dial 21, a focusing dial 22 and a light quantity adjustment dial 23.

The projection lens 16 enlarges the light from the reflective display optical system 17, e.g., the information light carrying a picture or such information, and projects it on a screen 26 (see, FIG. 2) to display an image (hereinafter, projection image). This projection lens 16 is constituted of, for example, a variator lens, a focusing lens and an aperture stop, which are movable along a projection light axis 27.

The variator lens moves along the projection light axis 27 according to manipulation of the zooming dial 21 so as to enlarge or reduce the projection image on the screen 26. The focusing lens moves along the projection light axis 27 in response to manipulation of the focusing dial 22 or movement of the variator lens, and adjusts focus of the projection image. The aperture stop changes the diameter of an aperture according to manipulation of the light quantity adjustment dial 23 so as to adjust the brightness of the projection image.

The projector drive section 18 controls electrical operations of the projector 10. For example, the projector drive section 18 displays an image, input from a computer connected to the projector 10, on reflective type display elements 54 to 56 (see, FIG. 2). Provided with motors to drive the projection lens 16, the projector drive section 18 moves the variator lens and the focusing lens along the projection light axis 27 or changes the diameter of the aperture according to manipulation of the zooming dial 21, the focusing dial 22 and the light quantity adjustment dial 23.

The reflective display optical system 17 separates white light generated from a light source unit 31 (see, FIG. 2) into red, green and blue light. Each color light is converted into information light that carries the information of corresponding color for a projection image. The information light of these colors is combined into projection light, which is guided to the projection lens 16 and projected as a full-color projection image on the screen 26.

Figure 2:
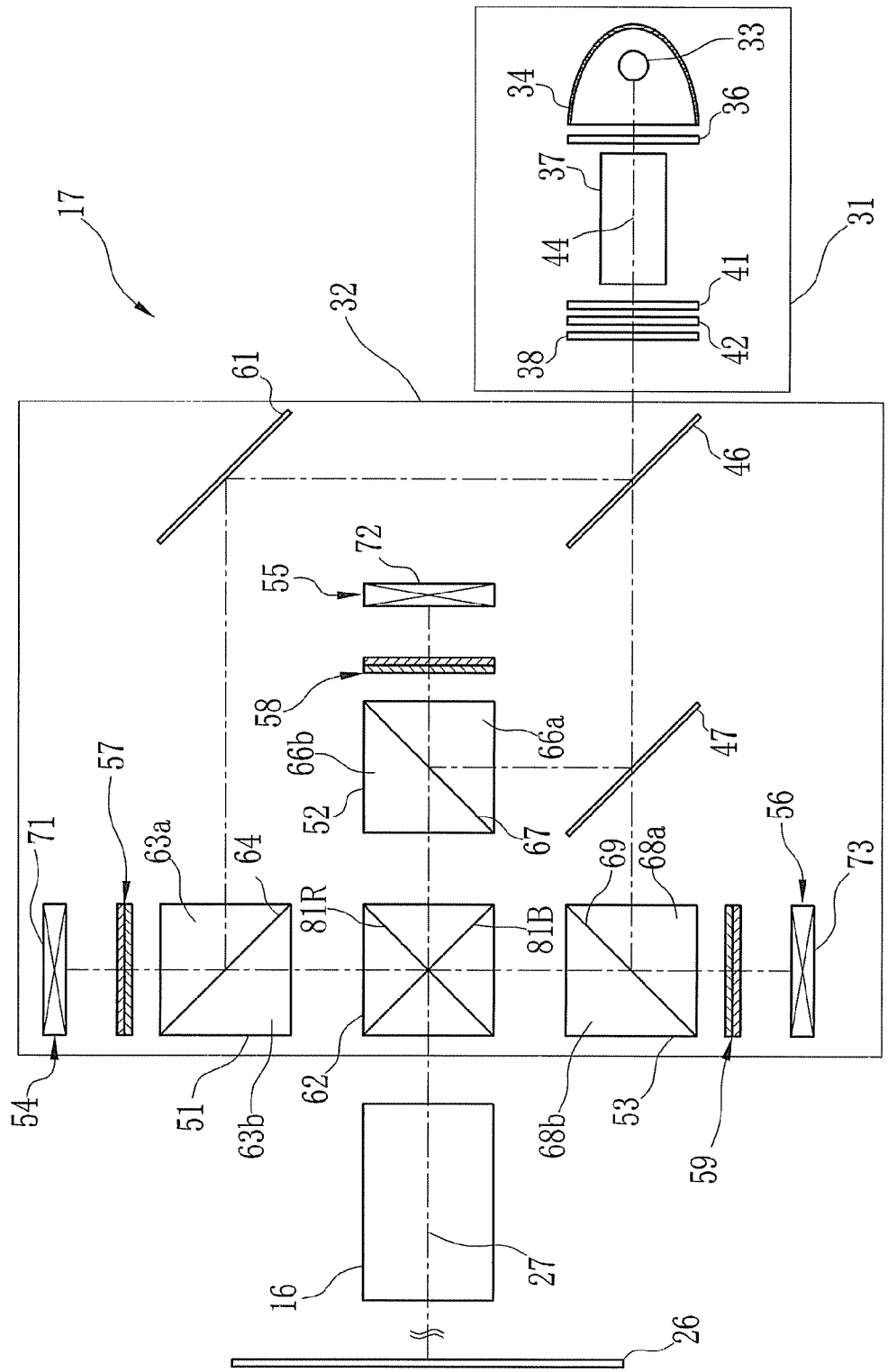
FIG. 2 is a schematic view illustrating an optical structure of the projector.

As shown in FIG. 2, the reflective display optical system 17 includes a light source unit 31 and an information light producing section 32 to produce information light from the light generated by the light source unit 31.

The light source unit 31 includes a lamp 33, a reflecting mirror 34, a UV cut filter 36, an integrator 37, a polarizer 38, a relay lens 41 and a collimate lens 42. The lamp 33 is a high intensity light source, such as a xenon lamp, and generates natural white light that is not polarized in any specific direction. This white light from the lamp 33 passes through the UV cut filter 36, where the ultraviolet component is removed, and enters the integrator 37.

The reflecting mirror 34 is a mirror of, for example, ellipsoidal shape. The lamp 33 is placed near one of focal points of the reflecting mirror 34, while one end of the integrator 37 is placed near another focal point of the reflecting mirror 34. This configuration serves to guide the light from the lamp 33 to the integrator 37 efficiently.

The integrator 37, composed of a plurality of roughly bundled glass rods and a micro-lens array formed on an end face of each glass rod, uniformly blends the light rays from the lamp 33, and guides them to the collimate lens 42 through the relay lens 41. Since the quantity of the light that enters the integrator 37 from the lamp 33 becomes smaller as away from a light source axis 44, the light is nonuniformly distributed. The integrator 37 changes this nonuniform distribution of light quantity to substantially uniform distribution around the light source axis 44. Accordingly, the projection image appears with substantially uniform brightness throughout the screen 26.

The collimate lens 42 converts the light from the integrator 37 to parallel light to the light source axis 44, and guides it to the polarizer 38. The polarizer 38 guides the S-polarized components of the light from the integrator 37 directly, while guiding the P-polarized components after converting them into the S-polarized components, to a dichroic mirror 46 of the information light producing section 32.

The information light producing section 32 includes the dichroic mirrors 46, 47, polarizing beam splitters 51, 52, 53, the reflective type display elements 54, 55, 56 and phase compensation elements 57, 58, 59. Additionally, a mirror 61 and a cross-dichroic prism 62 are provided in the information light producing section 32.

The dichroic mirror 46 is placed to form a 45-degrees angle between a surface normal and the light source axis 44. The dichroic mirror 46 reflects the red light components of the S-polarized white light coming from the light source unit 31 to the mirror 61, while transmitting and guiding the green and blue light components of the S-polarized white light to the dichroic mirror 47. The mirror 61 is aligned parallel to the dichroic mirror 46 so as to reflect the red light, which the dichroic mirror 46 separates from the white light, to the polarizing beam splitter 51. On the other hand, the dichroic mirror 47 reflects the green light component, contained in cyan light made up of the green and blue light that has passed through the dichroic mirror 46, to the polarizing beam splitter 52, while it transmits the blue light component to the polarizing beam splitter 53.

The polarizing beam splitter 51 is constituted of prisms 63*a*, 63*b* and a polarization separating layer 64. The prisms 63*a*, 63*b* are coupled to hold the polarization separating layer 64 between their inclined surfaces, and the polarizing beam splitter 51 has a substantially cubic shape. The polarizing beam splitter 51 reflects the S-polarized red light, coming from the mirror 61, to the reflective type display element 54. This red light reflects off the reflective type display element 54 to become the light containing a picture or such information (hereinafter, red information light), and enters the polarizing beam splitter 51 again. The S-polarized light component of the red information light is reflected by the polarization separating layer 64. The P-polarized light component of the red information light, on the other hand, passes through the polarization separating layer 64, and enters the cross-dichroic prism 62.

In the same manner, the polarizing beam splitter 52 is constituted of prisms 66*a*, 66*b* and a polarization separating layer 67. The polarizing beam splitter 52 reflects the S-polarized green light, coming from the dichroic mirror 47, to a reflective type display element 55. This green light reflects off the reflective type display element 55 to become the light containing a picture or such information (hereinafter, green information light), and enters the polarizing beam splitter 52 again. The S-polarized light component of the green information light is reflected by the polarization separating layer 67. The P-polarized light component of the green information light, on the other hand, passes through the polarization separating layer 67, and enters the cross-dichroic prism 62.

Also, in the same manner, the polarizing beam splitter 53 is constituted of prisms 68*a*, 68*b* and a polarization separating layer 69. The polarizing beam splitter 53 reflects the S-polarized blue light, passing through the dichroic mirror 47, to a reflective type display element 56. This blue light reflects off the reflective type display element 56 to become the light containing a picture or such information (hereinafter, blue information light), and enters the polarizing beam splitter 53 again. The S-polarized light component of the blue information light is reflected by the polarization separating layer 69. The P-polarized light component of the blue information light, on the other hand, passes through the polarization separating layer 69, and enters the cross-dichroic prism 62.

The cross-dichroic prism 62 has a dichroic surface 81R to reflect the red light, and a dichroic surface 81B to reflect the blue light. Both the dichroic surfaces 81R, 81B transmit the green light. Namely, the cross-dichroic prism 62 reflects the red information light coming from the polarizing beam splitter 51 and the blue information light coming from the polarizing beam splitter 53 to the projection lens 16, while it transmits the green information light coming from the polarizing beam splitter 52. In other words, the cross-dichroic prism 62 combines the red, green and blue information light into full-color projection light, and guides it to the projection lens 16.

The reflective type display element 54 is a liquid crystal panel of, for example, reflective type, and includes a liquid crystal layer enclosing liquid crystal molecules and a reflective surface 71 to reflect incident light. The reflective surface 71 has reflecting electrodes provided for every pixel, and controls the orientation of the liquid crystal molecules in each pixel by turning on and off the voltage applied to the liquid crystal layer. Operation of each reflecting electrode is controlled through a drive circuit by the projector drive section 18. Hereafter, the pixels controlled to display white are referred to as ON pixels, while those controlled to display black are referred to as OFF pixels.

The liquid crystal layer changes the orientation of the liquid crystal molecules according to the voltage applied thereto, and changes polarization of the light reflected by the reflective surface 71. For example, the S-polarized light that enters the ON pixel from the polarizing beam splitter 51 is converted into the P-polarized light according to the orientation of the liquid crystal molecules, and reflected back to the polarizing beam splitter 51. In contrast, the S-polarized light that enters the OFF pixel is directly reflected back to the polarizing beam splitter 51, without being converted.

Similarly to the reflective type display element 54, the reflective type display elements 55, 56 are both the reflective type liquid crystal panels having reflective surfaces 72, 73 respectively to include reflecting electrodes provided for every pixel. The S-polarized light that enters the ON pixel of the reflective type display elements 55 or 56 is converted into the P-polarized light according to the orientation of the liquid crystal molecules, and reflected back to the polarizing beam splitter 52 or 53. In contrast, the S-polarized light that enters the OFF pixel of the reflective type display elements 55 or 56 is directly reflected back to the polarizing beam splitter 52 or 53, without being converted.

The phase compensation element 57 is located between the polarizing beam splitter 51 and the reflective type display element 54, and compensates the polarizing direction of the light that passes through it. For example, the phase compensation element 57 changes the phase of the passing skew rays to the phase to be reflected by the polarization separating layer 64 of the polarizing beam splitter 51, so that only the red information light that correctly shows the information of the projection image enters the polarizing beam splitter 51. In other words, the phase compensation element 57 adjusts the phase of light such that the components derived from the skew rays are removed from the red information light entering the polarizing beam splitter 51.

Similarly, the phase compensation element 58 is allocated between the polarizing beam splitter 52 and the reflective type display element 55, and adjusts the phase of light such that the components derived from the skew rays are removed from the green information light. Yet similarly, the phase compensation element 59 located between the polarizing beam splitter 53 and the reflective type display element 56, and adjusts the phase of light such that the components derived from the skew rays are removed from the blue information light.

Figure 3:
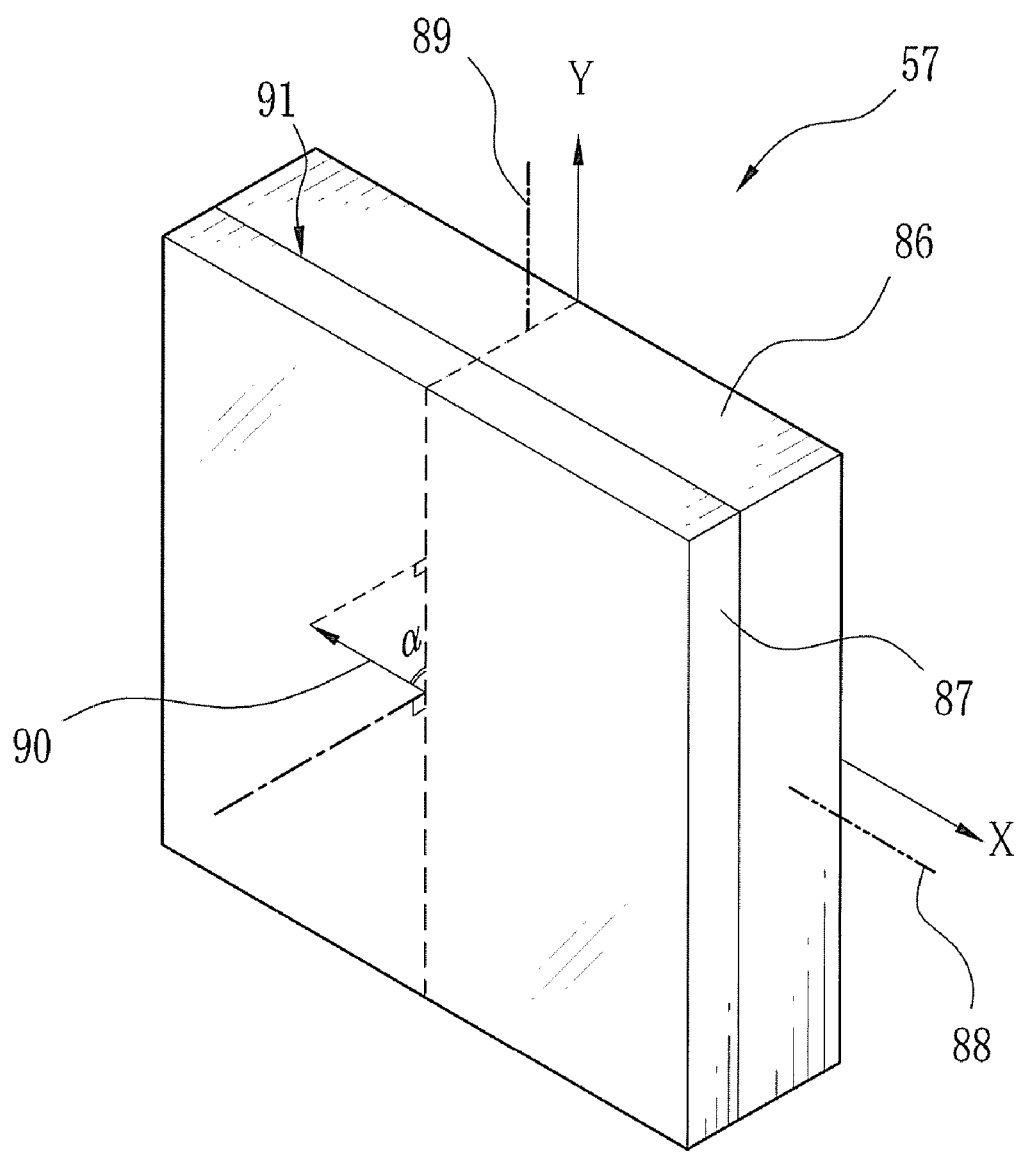
FIG. 3 is a perspective view of a phase compensation element.

More specifically, as shown in FIG. 3, the phase compensation element 57 includes a crystal structure retardation layer 86 (first birefringent element) and an inclined-axis retardation layer 87 (second birefringent element), and compensates the polarization direction of the red information light that passes through it. The crystal structure retardation layer 86 is a quartz substrate having a fast axis 88 in an X-axis direction and a slow axis 89 in a Y-axis direction. When the light passes through this crystal structure retardation layer 86, the components in the slow axis (89) direction are delayed relative to the components in the fast axis (88) direction. Namely, the crystal structure retardation layer 86 is so-called a quarter-wave plate that slows down the propagation of the light in the slow axis direction only by quarter waves relative to the light in the fast axis direction. Therefore, the polarizing direction of the skew rays is compensated by this crystal structure retardation layer 86 into the phase to be reflected by the polarization separating layer 64 of the polarizing beam splitter 51.

The inclined-axis retardation layer 87 is a thin layer of birefringent material, and shows the property of an index ellipsoid. This inclined-axis retardation layer 87 is formed to a predetermined thickness on a surface 91 of the crystal structure retardation layer 86 facing the polarizing beam splitter 51. The inclined-axis retardation layer 87 is so-called an O-plate, a direction 90 of whose principal refractive index is inclined with respect to the surface 91. The inclined-axis retardation layer 87 is made by, for example, obliquely depositing $Ta_2O_5$ on the surface 91. Therefore, in the inclined-axis retardation layer 87, a number of inclined columnar microstructures of $Ta_2O_5$ stand together, and the inclination of the columnar structures determines the angle of the direction 90 of principal refractive index to the surface 91. This kind of oblique deposition layer is biaxially birefringent, in most cases, and has three different principal refractive indexes. Among these principal refractive indexes, the largest principal refractive index extends in the growth direction of the columnar structures, and the second largest principal refractive index extends perpendicular to the largest principal refractive index. The smallest principal refractive index extends perpendicular to both the largest and second largest principal refractive indexes. Hereafter, in this specification, the largest principal refractive index is referred to as the principal refractive index unless otherwise noted. An angle α (degree) of the direction 90 of the principal refractive index to the surface 91 is adjusted to a desired value (for example, α=60°) by changing the angle of oblique deposition. This angle α is preferably not less than 45° and not greater than 90°, and more preferably not less than 50° and not greater than 80°, and yet preferably not less than 55° and not greater than 70°. Additionally, the inclined-axis retardation layer 87 is oriented such that an orthogonal projection of the direction 90 on the surface 91 is parallel to the slow axis 89 of the crystal structure retardation layer 86. Note that the inclined-axis retardation layer 87 may be formed in the polarizing beam splitter 51.

As a result, the phase compensation element 57 composed of the crystal structure retardation layer 86 and the inclined-axis retardation layer 87 has the principal refractive index inclined to the surface, and causes quarter-wave equivalent phase difference to the light passing almost vertically through it.

Similarly to the phase compensation element 57, each of the phase compensation elements 58, 59 is composed of the crystal structure retardation layer and the inclined-axis retardation layer 87, so that it has the direction of the principal refractive index that inclines to the surface, and adds the phase difference equivalent to quarter waves to the light that passes through it.

Figure 4:
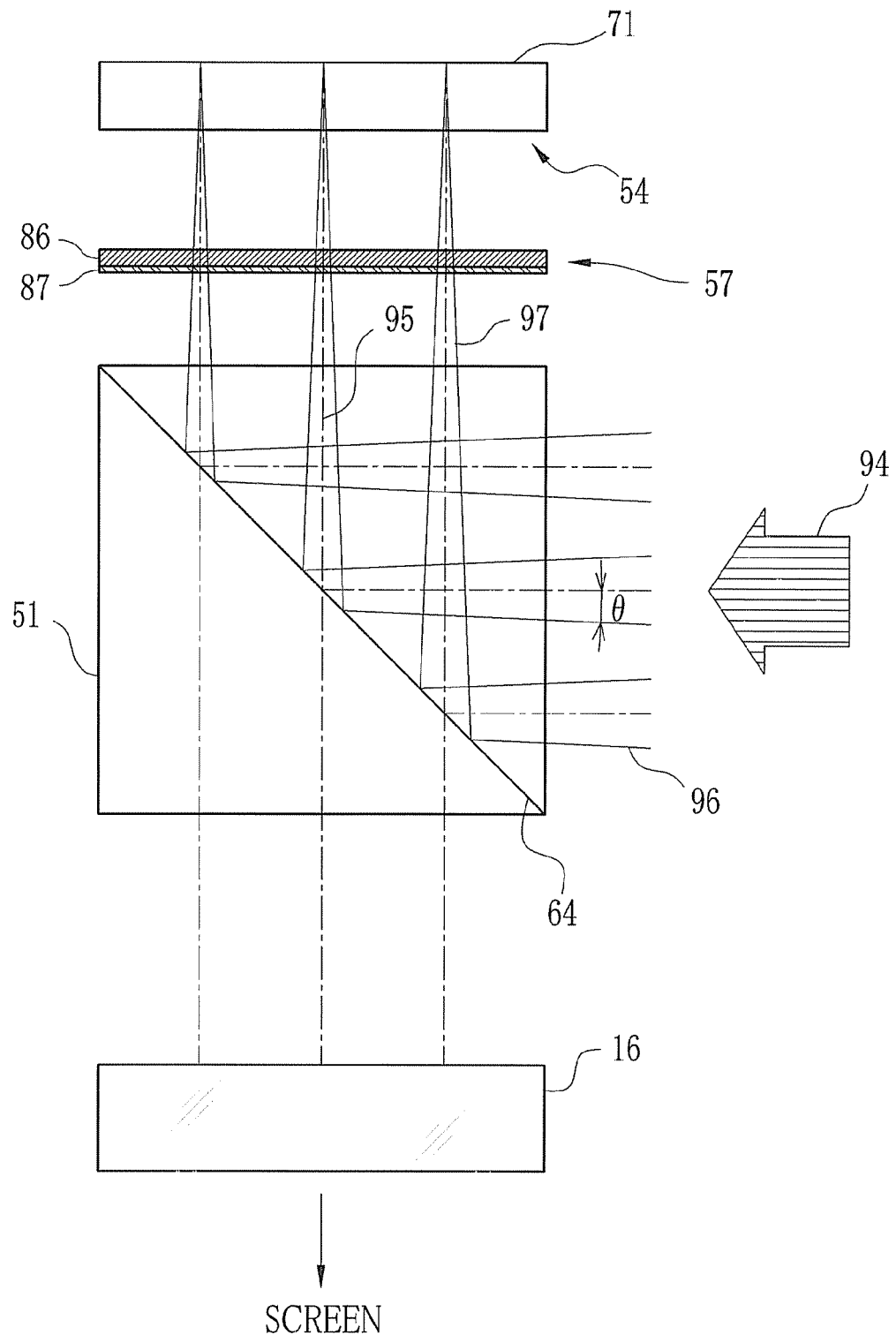
FIG. 4 is an explanatory view of skew rays contained in color light.

Next, the operation of the projector 10 is described. As shown in FIG. 4, the white light generated from the light source unit 31 is separated into colors, and the red light 94 of this enters the polarizing beam splitter 51 at a 45-degrees angle to the polarization separating layer 64.

Since the red light 94 is converted into the S-polarized light, it is reflected by the polarization separating layer 64, and passes through the phase compensation element 57, and then enters the reflective type display element 54 at substantially right angle. When the red light 94 reflects off the ON pixel of the reflective type display element 54, it is converted from the S-polarized light into the P-polarized light. When the red light 94 reflects off the OFF pixel of the reflective type display element 54, in contrast, it remains the S-polarized light. The red light 94 thus reflected by the reflective type display element 54 enters again, as the red information light 95 corresponding to each pixel's ON or OFF state, to the polarizing beam splitter 51.

Among this red information light 95, the S-polarized components that correspond to the OFF pixels are reflected by the polarization separating layer 64. In contrast, the P-polarized components that correspond to the ON pixels pass through the polarization separating layer 64. As a result, only the P-polarized components modulated by the ON pixels in the red information light 95 contribute to the projection light.

The red light 94 contains so-called skew rays 96 which enter the polarizing beam splitter 51 at an angle θ with respect to a 45-degrees incident angle to the polarization separating layer 64. In the projector 10, the angle θ at which the skew rays 96 enter the polarizing beam splitter 51 is in the range of about 20°.

These skew rays 96 are also the S-polarized light, and therefore reflected by the polarization separating layer 64. Then, the skew rays enter the phase compensation element 57 from the direction inclined by the angle θ to a surface normal of the phase compensation element 57, and pass through it. Additionally, the skew rays enter the reflective type display element 54 from the direction inclined by the angle θ to the reflective type display element 54, and reflect off the ON or OFF pixels to become red information light 97, and then enter again to the polarizing beam splitter 51.

Figure 5A:
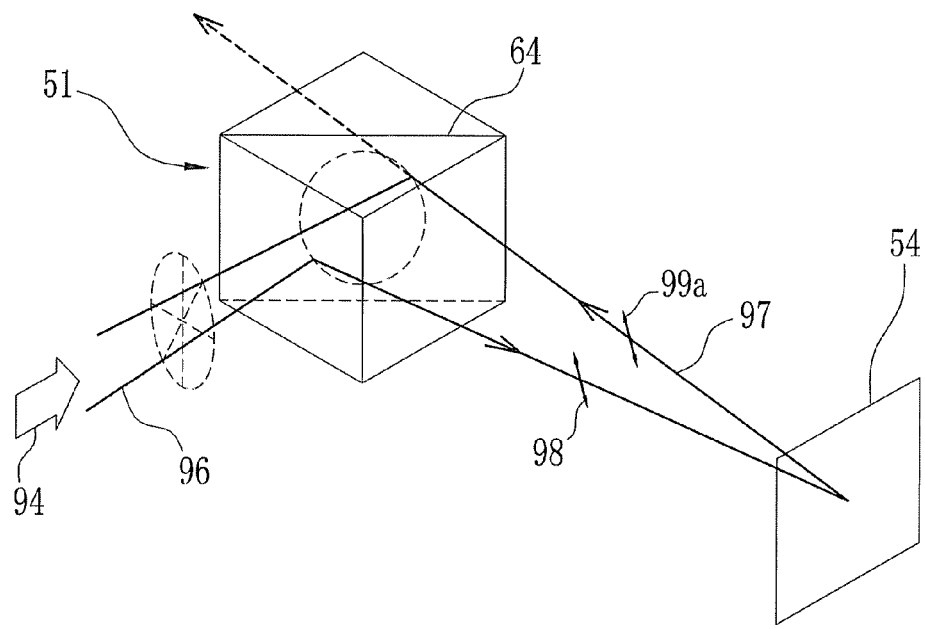
FIG. 5A is an explanatory view of a trace of the skew ray when the phase compensation element is not used.
Figure 5B:
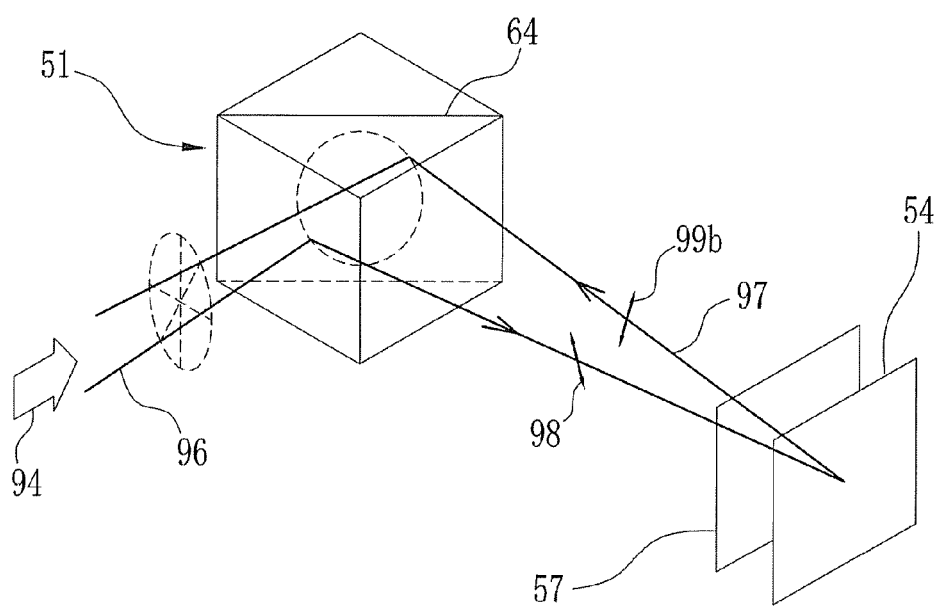
FIG. 5B is an explanatory view of the trace of the skew ray when the phase compensation element is used.

Here, with reference to FIG. 5A and FIG. 5B, the operation of the phase compensation element 57 to the skew rays 96 is described. These drawings show the polarization state of a single skew ray 96 modulated by the OFF pixel, where the phase compensation element 57 is not used in FIG. 5A, while it is used in FIG. 5B. In either case, a polarizing axis 98 of the skew ray 96 is shifted in the S-polarizing direction which is determined by a geometric relationship between a plane of the polarization separating layer 64 and a light ray. Therefore, when the skew ray 96 is reflected by the polarization separating layer 64, the polarizing axis 98 thereof is inclined.

As shown in FIG. 5A where the phase compensation element 57 is not used, a polarizing axis 99a of the red information light 97 is inclined in the same direction as the polarizing axis 98 of the skew ray 96. This means that the red information light 97 is not a complete S-polarization to the polarization separating layer 64, and that a part of the red information light 97 reflected by the OFF pixel is able to pass through the polarizing beam splitter 51. As a result, the projection image appears with a little poor contrast. To the contrary, in FIG. 5B where the phase compensation element 57 is used, the red information light 97 has a polarizing axis 99b adjusted to an appropriate inclination direction, and it becomes a complete S-polarization. The red information light 97 reflected by the OFF pixel is not able to pass through the polarizing beam splitter 51, and contrast is improved for the projection image.

A single skew ray is shown in FIG. 5A and FIG. 5B, but indeed, a plurality of different angle skew rays constitute a ray bundle. Therefore, the angle of the polarizing axis 98 has a range of ±5° depending on the angles of the skew rays. This phase compensation element 57 can appropriately compensate the phase of all the skew rays of the ray bundle, and the polarizing axis 99b of the red information light 97 is therefore oriented in a complete S-polarizing direction. Since the red information light 97 is reflected by the polarization separating layer 64 accordingly, it does not affect the contrast of the projection image.

It is to be noted that the phase compensation element 57 is used to prevent contrast reduction due to angle dependency of the polarizing beam splitter, which should be dealt separately from the viewing angle dependency of the liquid crystal display element. Therefore, a separate phase compensation member corresponding to a desired liquid crystal mode of TN, VAN, OCB or IPS may be used to solve the viewing angle dependency problem of the liquid crystal display element.

In the same manner as above, the skew rays in the green light are compensated by the phase compensation element 58, and the green information light derived from the skew ray does not pass through the polarizing beam splitter 52. Also, the skew rays in the blue light are compensated by the phase compensation element 59, and the blue information light derived from the skew ray does not pass through the polarizing beam splitter 53.

In this manner, the projector 10 removes the information light derived from the skew rays, and displays a projection image with good contrast on the screen 26.

To evaluate the effect of the phase compensation element 57, a quartz substrate was prepared as the crystal structure retardation layer 86 (i.e., a quarter-wave plate), and positioned between the polarizing beam splitter 51 and the reflective type display element 54. All the pixels were adjusted to the OFF state, and a conoscopic image of the reflective type display element 54 was captured through the polarizing beam splitter 51.

Figure 6A:
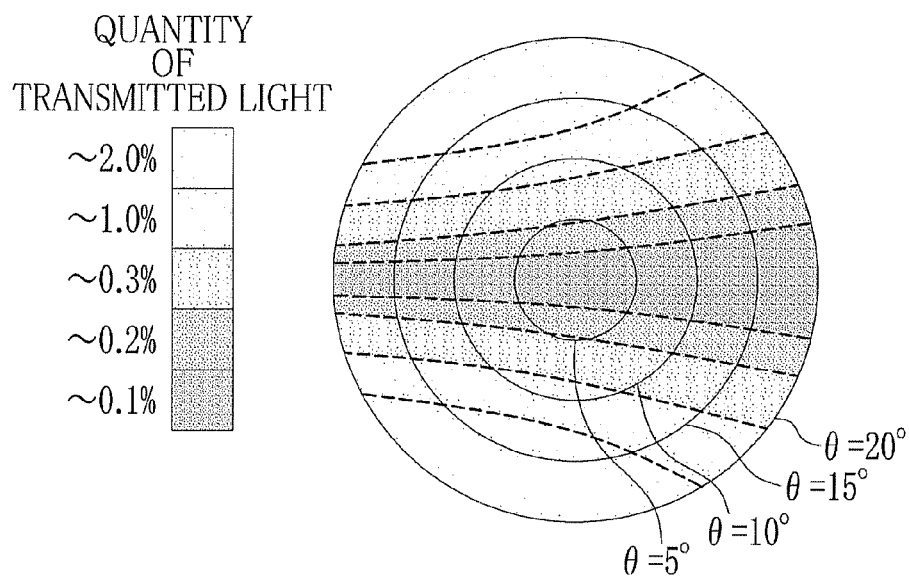
FIG. 6A is a conoscopic presentation of angular contrast distribution of rays in a reflective type display element combined only with crystal structure retardation layer.

This conoscopic image, shown FIG. 6A, indicated that the quantity of the light passing through the polarizing beam splitter 51 (hereinafter, quantity of transmitted light) counted for substantially 0.1% only in an extremely narrow range. Additionally, as much as 1.0% to 2.0% of light was transmitted at the areas with large angle θ, even though all the pixels were set to the OFF state in the reflective type display element 54. This means that the phase of the skew rays is not fully compensated only with a quarter-wave plate in a 20-degrees range of the angle θ, and that the contrast of a projection image is hardly improved.

Next, a phase compensation element was made up with the quartz substrate as the crystal structure retardation layer 86, and the inclined-axis retardation layer 87 that was made of $Ta_2O_5$ and had a 0.5 μm thickness and a 60-degrees angle α of the principal refractive index to the surface (30-degrees inclination to the surface normal). Note that the inclined-axis retardation layer 87 caused 30 nm phase difference to the light passing almost vertically through it.

Figure 6B:
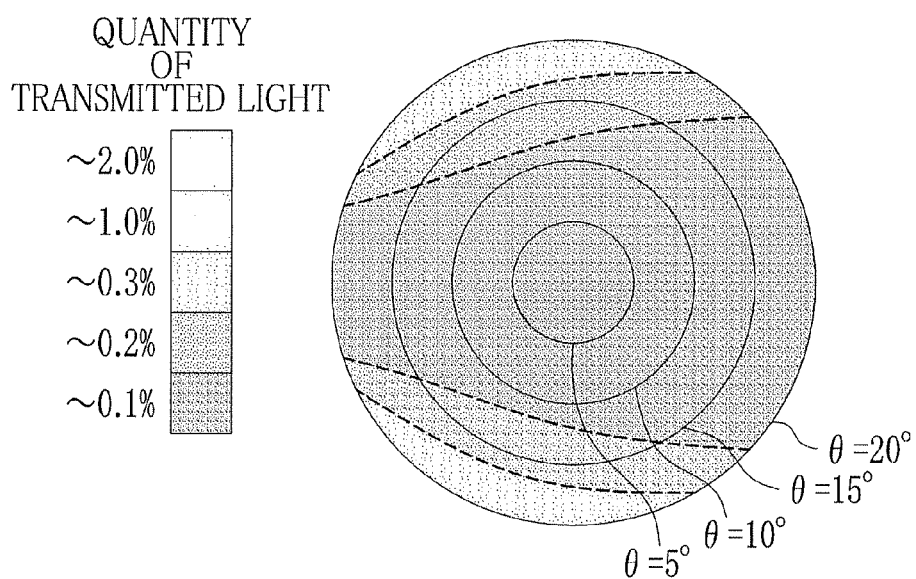
FIG. 6B is a conoscopic presentation of angular contrast distribution of rays in the reflective type display element combined with the phase compensation element.

This phase compensation element was introduced, and a conoscopic image of the reflective type display element 54 was captured through the polarizing beam splitter 51. In this conoscopic image, shown in FIG. 6B, the quantity of transmitted light was dramatically reduced to substantially 0.1% in most of the 20-degrees range of the angle θ. Additionally, even in the areas of large angle θ, the quantity of transmitted light counted for only 0.2% to 0.3%. This means that the phase compensation element effectively compensated the phase difference of the skew rays, compared to the quarter-wave plate only, and effectively improves the contrast of a projection image.

As described above, according to the present invention, the phase difference of the skew rays is effectively compensated, and a projection image gains good contrast throughout a wide viewing angle range.

The phase compensation element functioning in this manner can be obtained by combining the first birefringent element, having the slow axis on a plane parallel to the reflective type display element 54, and the second birefringent element, having the property of an index ellipsoid which is inclined to the reflective surface and has a symmetrical plane perpendicular to the reflective surface, such that the direction of a principal refractive index in the symmetrical plane is parallel, when orthogonally projected on a plane parallel to the reflective surface, to the slow axis of the first birefringent element and that the light proceeding vertical to the reflective surface of the reflective type display element 54 causes a total of substantially λ/4 phase difference, wherein the λ is wavelength of light passing through the first and second birefringent elements.

The crystal structure retardation layer 86, as the first birefringent element, need not be composed of such an expensive crystal plate cut out to have an inclined crystal axis, but may be a general wave plate composed of a stretched polymer film, a quartz plate or a sapphire plate. The stretched polymer film, when used, may be laminated to a glass or such substrate. The quartz, sapphire or such plate crystal may be used as a substrate in its own. Therefore, the present invention can be carried out inexpensively and easily.

The crystal structure retardation layer 86 shows different phase difference values depending on the thickness thereof. Therefore, the crystal structure retardation layer 86 can be adjusted to the thickness that cause, when combined with the inclined-axis retardation layer 87 as the second birefringent element, substantially quarter wavelength phase difference to the light at the wavelength of corresponding color. For example, since the vertical incident light to the inclined-axis retardation layer 87 causes 30 nm birefringence in the above embodiment, the crystal structure retardation layer 86 will be made thinner by the value corresponding to the 30 nm phase difference than the case where the quarter-wave plate is constituted only of the crystal structure retardation layer, the total retardation of the crystal structure retardation layer 86 and the inclined-axis retardation layer 87 becomes a quarter wavelength which appropriately compensates for the phase difference of the skew rays. To the contrary, when vertical incident light on the inclined-axis retardation layer 87 has a birefringent value of 30 nm, but in the direction to cancel the birefringence caused by the crystal structure retardation layer 86, the crystal structure retardation layer 86 will be made thicker by the value corresponding to the 30 nm phase difference than a common quarter-wave plate.

The inclined-axis retardation layer 87, used as the second birefringent element needs to have an index ellipsoid which is inclined to a plane parallel to the reflective type display element 54 and also plane-symmetrical to a plane perpendicular to the reflective type display element 54. If it is a birefringent member of this kind, the inclined-axis retardation layer 87 may be either uniaxial or biaxial. In this case, the inclined-axis retardation layer 87 may also be positively birefringent, negatively birefringent, or even neither such as, for example, a polymer film made by the polymerizing reaction to fix the hybrid orientation state of rod-like or disc-like polymerizable liquid crystal molecules.

The phase difference value of the second birefringent element can be changed by the inclination angle in a manner that it produces the effect when combined with the first birefringent element, i.e., the crystal structure retardation layer 86. If inclination angle of the birefringent body is 20° or more to the reflective type display element 54, the second birefringent element can advantageously be made thinner than the thickness to cause a total phase difference of quarter wavelength.

Especially advantageous is the oblique deposition film, which has the inclination angle between 40° and 70°. This large inclination angle serves to reduce the thickness of the inclined-axis retardation layer 87 to as small as 0.5 µm, and there occurs no problem that the inclined-axis retardation layer 87 increases haze and lowers the polarization. Additionally, the principal refractive index maybe inclined at an easily achievable angle between 45° and 90° to the surface.

While the inclined-axis retardation layer 87 is made of $Ta_2O_5$ in the above embodiment, it may be made of $TiO_2$, $ZrO_2$, $SiO_2$, $MgF_2$, $CaF_2$, $CeO_2$, $SnO_2$, $In_2O_3$, $ZrTiO_4$, $HfO_2$, $Al_2O_3$, MgO, $AlF_3$, a diamond thin film, $LaTiO_x$ or a samarium oxide. These inorganic materials, when used for the inclined-axis retardation layer 87, allow producing a polarization control system and a projector that work stable over long periods.

Also, the inclined-axis retardation layer 87 may be made of a polymerizable liquid crystal polymer. Although the polymerizable liquid crystal polymer may probably be deteriorated by the ultraviolet rays when used as an O-plate under a high illumination circumstance over long periods, the crystal structure retardation layer as a quarter-wave plate provides minimum phase difference compensation, and a polarization control system and a projector will work stable over long periods.

While the above embodiment uses the reflective type display elements 54, 55, 56, other types of display elements may be used. For example, a transmissive liquid crystal display device in combination with an external reflector may be used. Additionally, any other common liquid crystal modes can be used.

In the above embodiment, the inclined-axis retardation layer 87 is obliquely deposited on the crystal structure retardation layer 86. The inclined-axis retardation layer 87 can, however, be placed at any place between the reflective surface of the reflective type display element and the polarization separating layer of the polarizing beam splitter.

Figure 7A:
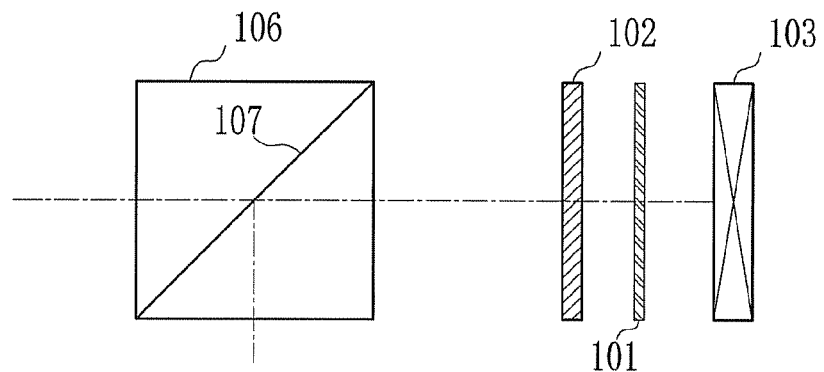
FIG. 7A to FIG. 7D are schematic views illustrating arrangements of an inclined-axis retardation layer 87.
Figure 7B:
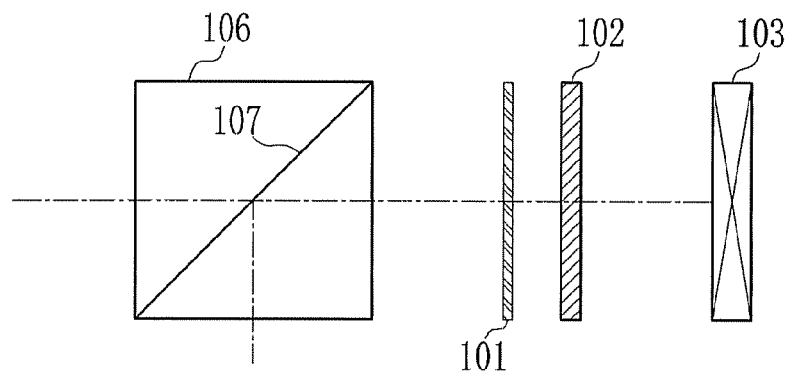

For example, as shown in FIG. 7A, an inclined-axis retardation layer 101 may be separated from a crystal structure retardation layer 102, and positioned between a reflective type display element 103 and crystal structure retardation layer 102. Also, as shown in FIG. 7B, the inclined-axis retardation layer 101 may be positioned between a polarizing beam splitter 106 and the crystal structure retardation layer 102. In both cases, if the inclined-axis retardation layer 101 is to be fabricated as a single element, it is laminated on a glass or such transparent substrate.

Figure 7C:
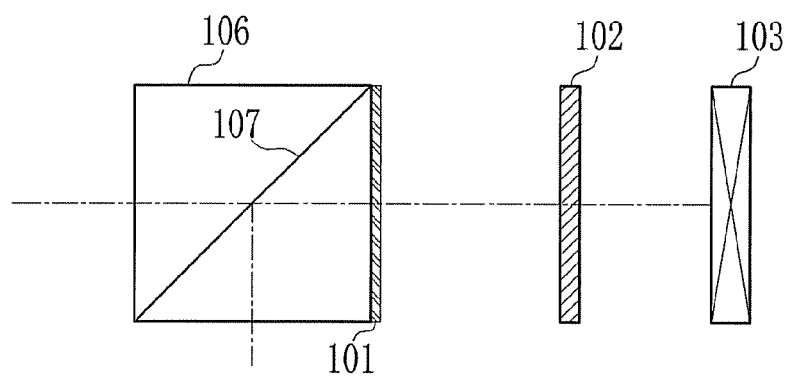

Alternatively, as shown in FIG. 7C, the inclined-axis retardation layer 101 may be formed on the surface of the polarizing beam splitter 106 to face the reflective type display element 103.

Figure 7D:
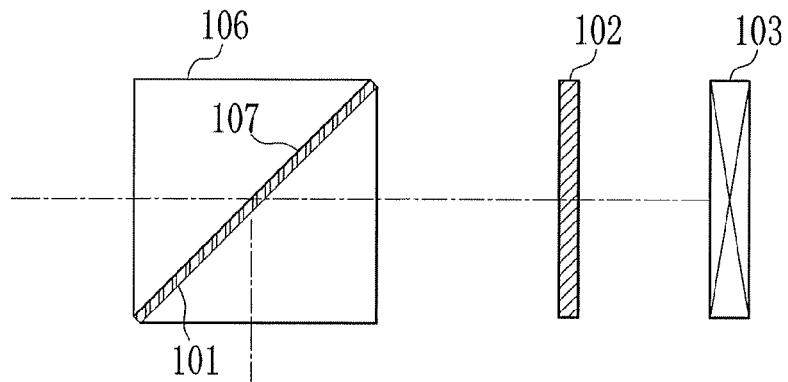

Still alternatively, as shown in FIG. 7D, the inclined-axis retardation layer 101 may be formed on the polarization separating layer 107 to face the reflective type display element 103 from inside the polarizing beam splitter 106. In this case, since the polarization separating layer 107 is arranged aslant at 45° to incident light, the inclined-axis retardation layer 101 is to be formed on an inclined surface to incident light. Therefore, in the oblique deposition process to form the inclined-axis retardation layer 101, the oblique deposition angle that determines the inclination direction of the principal refractive index becomes easier in fabrication. Meanwhile, performing oblique deposition in a shallow angle direction to the polarization separating layer 107 makes it easy to fabricate an even thinner and low-haze inclined-axis retardation layer 101.

Moreover, the inclined-axis retardation layer 101 shown in FIGS. 7(A)-7(D) may be formed on or inside the reflective type display element.

While the above embodiment illustrates the polarization control system used in the projector, the polarization control system of the present invention is applicable to other optical devices having the polarizing beam splitter. For example, this polarization control system can be used in a CD or optical disc read/write device.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A polarization control system comprising:
  a polarizing beam splitter having a polarization separating layer to split incident light depending on a polarizing direction and transmit or reflect said light;
  a reflective type liquid crystal element having a reflective surface to reflect said light from said polarizing beam splitter back to said polarizing beam splitter, and controlling a polarizing direction of said light before and after the reflection of said light by said reflective surface;
  a first birefringent element disposed between said polarization separating layer of said polarizing beam splitter and said reflective surface of said reflective type liquid crystal element, so that a surface of said first birefringent element is substantially parallel to said reflective surface, and having a slow axis on a plane parallel to said reflective surface; and
  a second birefringent element disposed between said polarization separating layer of said polarizing beam splitter and said reflective surface of said reflective type liquid crystal element in such a manner that said second birefringent element has an index ellipsoid inclined with respect to a plane parallel to said reflective surface, and said index ellipsoid has a symmetrical plane perpendicular to said reflective surface, and a direction of a principal refractive index on said symmetrical plane is parallel to said slow axis of said first birefringent element, when orthogonally projected on said reflective surface,
  wherein light traveling vertically to said reflective surface of said reflective type liquid crystal element has a total phase difference of substantially $\lambda/4$ by passing through said first and second birefringent elements, where $\lambda$ designates a wavelength of light.

2. The polarization control system of claim 1, wherein said second birefringent element comprises an oblique deposition film made of inorganic material by oblique deposition.

3. A projector comprising said polarization control system as described in claim 2.

4. The polarization control system of claim 1, wherein said second birefringent element is made of a polymer of polymeric liquid crystal molecules.

5. A projector comprising said polarization control system as described in claim 4.

6. A projector comprising said polarization control system as described in claim 1.

* * * * *